Sept. 17, 1957 F. K. H. NALLINGER 2,806,543
VEHICLE, AND MORE PARTICULARLY SUSPENSION
OF THE WHEELS THEREOF BY HALF AXLES
Filed May 24, 1955 3 Sheets-Sheet 1

Inventor
FRIEDRICH K. H. NALLINGER
BY Dicke and Craig
ATTORNEYS.

Sept. 17, 1957   F. K. H. NALLINGER   2,806,543
VEHICLE, AND MORE PARTICULARLY SUSPENSION
OF THE WHEELS THEREOF BY HALF AXLES
Filed May 24, 1955   3 Sheets-Sheet 2

Inventor
FRIEDRICH K. H. NALLINGER.
BY Dicke and Craig
ATTORNEYS.

United States Patent Office 2,806,543
Patented Sept. 17, 1957

2,806,543

VEHICLE, AND MORE PARTICULARLY SUSPENSION OF THE WHEELS THEREOF BY HALF AXLES

Friedrich K. H. Nallinger, Stuttgart, Germany, assignor to Daimler-Benz Aktiengesellschaft, Stuttgart-Unterturkheim, Germany Application May 24, 1955, Serial No. 510,720

Claims priority, application Germany May 24, 1954

10 Claims. (Cl. 180—73)

My invention relates to a vehicle and, more particularly, to the suspension of the wheels thereof, especially of the driven wheels of a motor vehicle.

The object of the invention is an improved independent suspension of the wheels ensuring soft riding qualities combined with superior road hugging qualities.

It is a more specific object of the invention to provide a wheel suspension ensuring improved stabilisation of the vehicle in curves coupled with a decreased variation of the tread distance. It is well known that oscillating half axles causing the axes of the wheels to perform a pivotal motion about a horizontal, more or less longitudinal axis of the vehicle ensure an increased curve stability of the vehicle compared with that obtainable by wheel suspensions in which the wheel axes perform a translatory up and down movement relative to the body. A half axle suspension, however, has the inherent disadvantage of a considerable variation of the tread distance of opposite wheels coincidental to their up and down movement.

Another disadvantage inherent in a half axle suspension is the tendency of the wheels to transfer any transverse thrusts or shocks acting thereon in a substantially horizontal direction directly upon the vehicle body, particularly where the half axle is hinged to the vehicle body or to a support connected therewith.

It is the object of the present invention to greatly reduce such transfer of horizontal shocks and to improve the riding qualities of the vehicle in other respects.

Further objects of my invention will appear from the detailed description following hereinafter of a number of preferred embodiments thereof shown in the drawings and the features of novelty will be pointed out in the claims. However, I wish to emphasize that such detailed description is solely intended to illustrate the invention and is not to be interpreted as a restricted definition thereof.

In the drawings

Figure 1:
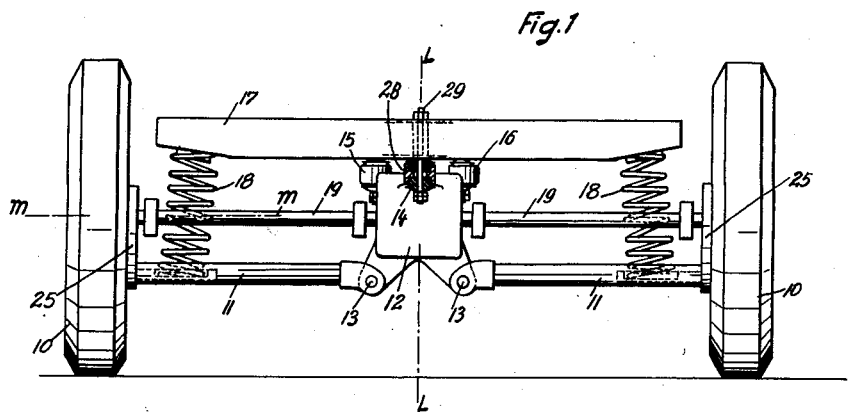
Fig. 1 is a rear view of the suspension of driven wheels of a motor vehicle.

In each of the embodiments shown hereinafter, a support 12, 112, 212 etc. is flexibly connected to the body or chassis 17, 117, 217 etc. of the vehicle by suitable means including resilient cushions 14, 15, 16 or 114, 115, 116 or 214, 215, 216 etc., such cushions being interposed between the support and the body affording the support independent movability to a certain degree. The opposite wheels, such as 10, 110, 210 etc., are journalled on axle members, such as 25, 125, 225 etc. Each axle member, such as 25, is rigidly connected with an arm, such as 11, 111, 211 etc. Each arm is pivotally connected to the support 12, 112, 212 etc. by a hinge, such as 13, 113, 213 etc., the pivotal axis extending fore and aft. Springs 18, 118, 218 etc. which are preferably helical springs are interposed between the body 17, 117, 217 etc. and the arms 11, 111, 211 etc., more particularly, projecting portions of the arms.

For the purposes of the present invention the hinges 13, 113, 213 etc. are located at a lower level than and spaced from the axes $m—m$ of the wheels. Where the suspension is applied to the driven wheels of a motor vehicle, the support 12, 112, 212 etc. is preferably formed by a rear axle transmission housing and includes a suitable gearing, not shown, for driving a shaft, such as 19, 119, 219 etc., which is cooperatively connected with a wheel 10, 110, 210 etc. and preferably extends coaxially therefrom directly into the housing 12, as shown in Figs. 1, 2, 4, 5 and 8.

Figure 2:
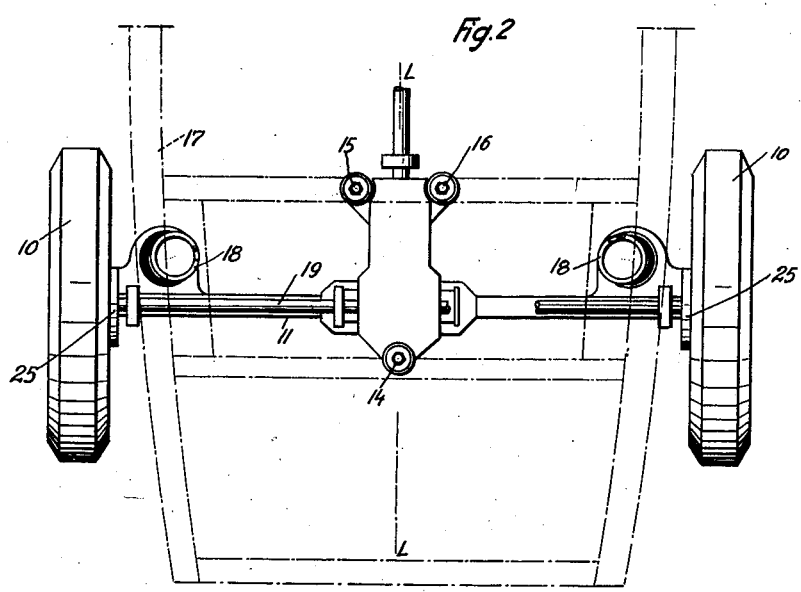
Fig. 2 is a plan view of the suspension shown in Fig. 1, the frame or body being indicated by dash-dotted lines.

As shown in Fig. 2 the helical springs 18 may be disposed adjacent to, and more particularly in front of, the driving shaft 19, 119, 219 etc.

Figure 3:
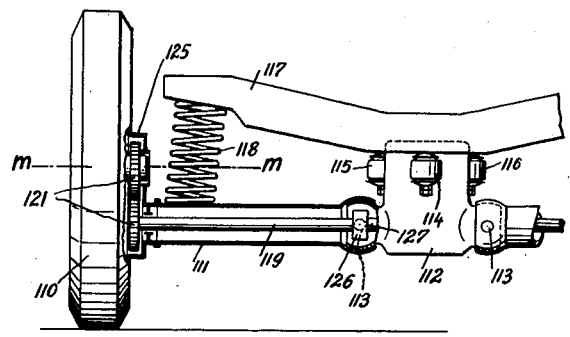
Fig. 3 is a partial view similar to that of Fig. 1 showing a suspension of the driven rear wheels of a motor vehicle.
Figure 4:
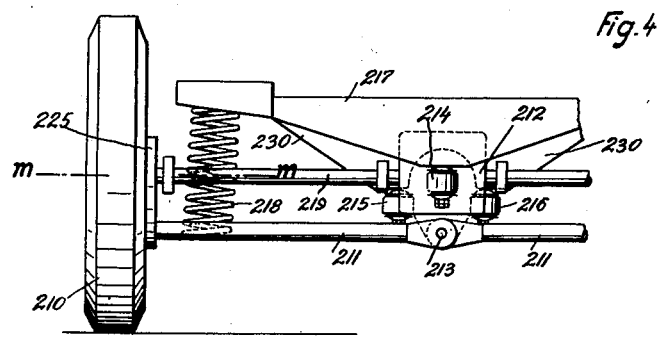
Figs. 4, 5, 6, 7 and 8 are similar views of various modified suspensions of the driven rear wheels.
Figure 5:
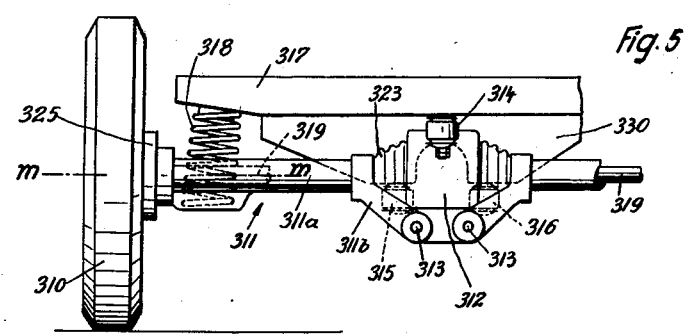
Figure 6:
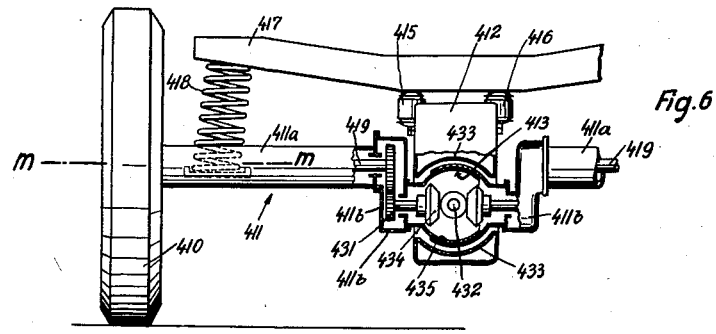
Figure 7:
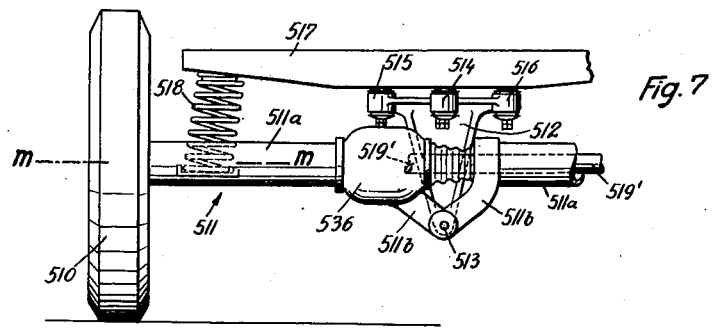
Figure 8:
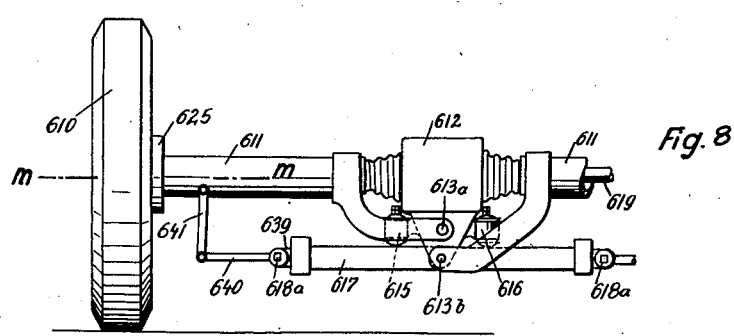

The hinges are preferably disposed symmetrically with respect to the vertical, longitudinal, central plane of the body in spaced relationship thereto as shown in Figs. 1, 3 and 5. However, if desired, the hinges may be disposed coaxially, their common axis being located in the vertical, longitudinal, central plane of the body as shown in Figs. 4, 6 and 7. Alternatively, the hinges may be located one above the other within the vertical, longitudinal, central plane of the body as shown in Fig. 8. In either case, however, the hinges are located at a lower level than and spaced from the axes $m—m$ of the wheels. Relative up and down movement of the wheels to the body or the chassis 17, 117, 217 etc. will cause the wheel carriers 25, 125, 225 etc. to perform an angular oscillatory movement about the associated hinges 13, 113, 213 etc.

The support, such as 12, 112, 212 etc., is preferably disposed beneath the body 17, 117, 217 etc. of the vehicle. However, in Fig. 8 I have shown an embodiment in which the support here again formed by the rear axle transmission housing 612 is mounted on top of the chassis 617.

The various embodiments and the distinctions thereof will now be described in greater detail.

The embodiment shown in Figs. 1 and 2 differs from some of the other embodiments in that the arms 11 throughout their lengths extend in spaced parallel relationship to the wheel axes $m—m$, each hinge being disposed spaced from and between the associated wheel and the central, vertical, longitudinal plane indicated by the dash-dotted lines L—L in Figs. 1 and 2.

The embodiment shown in Fig. 3 differs from that shown in Fig. 1 in that both the wheel support 125 and the arm 111 are hollow and accommodate transmission elements for transmitting the driving power from the gearing included in the transmission housing 112 to the wheel 110. The transmission elements comprise a shaft 119 coaxially journalled within the hollow arm 111 and a pair of meshing spur gears 121 mounted within the hollow wheel carrier 125, one spur gear 121 being secured to the outer end of shaft 119 and the other spur gear being secured to the wheel 110 in coaxial relationship thereto. In this embodiment the hinges 113 are formed by an internal cylindrical element secured to the housing 112 and an external cylindrical element secured to the arm 111. The two cylindrical elements are disposed in nested relationship for relative rotation about their common axis extending horizontally fore and aft of the vehicle. Within the hinge a universal joint 126 is inserted between the shaft 119 and the shaft 127 journalled in and projecting out of the housing 112 and connected to the gearing mechanism accommodated therein.

The embodiment shown in Fig. 4 differs from that illustrated in Fig. 1 primarily by the coaxial disposition of the hinges 213 and by the disposition of the cushions 214, 215, 216 at a considerably lower level beneath the wheel axes *m—m*. Here as in the other embodiments each cushion is constructed and disposed in a manner which will now be described with reference to Fig. 1 showing a vertical section of the rear central cushion. From Fig. 1 it will appear that the support 12 is integral with a sleeve-shaped portion 28 having an internal peripheral central flange. The cushion 14 is composed of two sections, one section being inserted into the sleeve-shaped portion 28 from the top thereof and the other cushion section being inserted into the sleeve-shaped portion 28 from the bottom thereof, both cushion sections abutting against the central internal flange of the sleeve-shaped portion 28. A bolt 29 passes through the cushion out of contact with the sleeve-shaped portion 28 and is provided with nuts pressing the cushion against the body. The term "body" as used here and in the claims is intended to include a chassis.

In the embodiment shown in Fig. 4, the body is provided with downwardly projecting elements 230 extending beneath the axes *m—m* for the attachment of the cushions 215 and 216. The arms 211 may be in form of wish-bone links.

The embodiment shown in Fig. 5 differs from that shown in Fig. 1 in that each arm is composed of a sleeve-shaped portion 311*a* rigidly connected to the associated axle member 325 and of a downwardly projecting portion 311*b* remote from the axle member 325. The hinge 313 pivotally connects the downwardly projecting portion 311*b* to the housing 312. A shaft 319 connected to the wheel 310 extends from the wheel coaxially thereto through the sleeve-shaped portions 311*a* into the housing 312. Flexible cuffs 323 are inserted between the housing 312 and the inner ends of the sleeve-shaped portions 311*a* in a sealed manner to prevent oil leakage. The rear cushion 314 is disposed above the axes *m—m* whereas the front cushions 315 and 316 are disposed therebelow and fixed to a depending portion 330 of the body 317.

The embodiment shown in Fig. 6 is similar to Fig. 5 differing therefrom primarily in that the downwardly projecting portions 411*b* of the arms 411 are hollow constituting a housing accommodating a pair of meshing spur gears, one being fixed to the inner end of shaft 419 and the other one being fixed to a shaft 431. The two arms 411 are hinged for oscillation about a common horizontal axis 432 disposed similar to that of the hinges shown in Fig. 4. The hinges, however, are similar to those shown in Fig. 3 in that they are formed by cylindrical sleeve portions 435 fixed to the inner ends of the arms 411 and mounted in nested relationship with a cylindrical sleeve portion 433 of the transmission housing 412. A drive shaft disposed in the transmission housing 412 coaxial to the axis 432 carries bevel gears each meshing with a bevel gear 434 secured to shaft 431. Here again the axis 432 of the hinges by which the arms 411 are pivotally mounted is located in spaced relationship below the wheel axes *m—m*.

The embodiment shown in Fig. 7 differs from those described hereinbefore in that the support 512 which is flexibly connected to the body 517 with the aid of the cushions 514, 515, 516 is a depending bracket carrying a horizontal pivot pin 513 located in the central longitudinal plane of the vehicle. As in Fig. 5 the depending portions 511*b* of the arms 511 are hinged on the pivot pin 513 which is located in spaced relationship below the wheel axes *m—m*. In this embodiment, however, the sleeve-shaped portion 511*a* of one of the arms includes a transmission housing 536 which is rigidly connected with the downwardly projecting portion 511*b*. The sleeve-shaped portion 511*a* of the other arm has an opening at its inner end and the transmission housing 536 is provided with an opening in opposite relationship thereto. The shaft 519' which is enclosed within the sleeve-shaped portion 511*a* extends through the openings into the transmission housing 536 and is drivingly connected with a suitable gearing in such transmission housing. A flexible cuff connected to the housing 536 and the right hand arm portion 511*a* surrounds the shaft 519'. The large vertical distance of the pivot 513 from the level of cushions 514, 515, 516 is of particular advantage in that it results in a considerable resiliency of pivot 513 in horizontal direction, a slight compression or expansion of cushions 515 and 516 resulting in a considerable horizontal displacement of the pin 513. Therefore, any transverse shocks acting on the wheel 510 in a more or less horizontal direction and transferred by arm 511 to the pin 513 will be very effectively absorbed by the rubber cushions 515 and 516.

The embodiment illustrated in Fig. 8 is similar to that shown in Fig. 5 differing therefrom in three respects. Firstly, as stated hereinabove already, the hinges 613*a* and 613*b* are located one above the other within a vertical, longitudinal, central plane of the body. Secondary, the housing 612 is mounted on top of a transverse member 617 of the body. Thirdly, a torsional spring rod 618*a* has been substituted for the helical spring 318. This spring rod extends horizontally fore and aft, one end being fixed to the body and the other end journalled in a bracket 639 secured to the body and carrying an arm 640 connected to the arm 611 by a link 641.

The invention is applicable to non-driven wheels of vehicles. In this event, the support need not be in form of a housing but may be similar to that shown in Fig. 7. The helical springs may be replaced by other springs as shown in Fig. 8. The driving shaft, such as 19, 119, 219 etc. may be disposed within a sleeve-shaped portion of the wheel-carrying arm as shown in Figs. 3, 5, 6, 7 and 8 or outside thereof as shown in Figs. 1 and 4. Gear transmissions, such as the transmission 121 in Fig. 3, may be disposed adjacent to the wheel as shown in Fig. 3 or adjacent to the transmission housing as shown in Fig. 6.

From the foregoing description it will appear that the hinge or the hinges of the wheel-carrying arms are disposed at a particularly low level. This has the effect that the arc drawn about the hinge through the point of contact of the wheel with the road extends nearly perpendicularly to the road, whereby a relative up and down movement of the wheels and the body causes greatly reduced variations of the tread distance of the wheels and greatly reduced thrusts produced coincidentally thereto upon the wheels in lateral direction. Such thrusts, moreover, will be effectively cushioned by the support, particularly where the hinge is considerably vertically spaced from the cushions connecting the support to the body. Therefore, the transverse thrusts and couples transferred by the hinges from the wheels to the support, particularly couples about a vertical axis, will be taken up by the resilient cushions connecting the arm support with the body in a satisfactory manner, such thrusts being effectively absorbed and the wheel-carrying arms being journalled in a rugged manner.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention of the limits of the appended claims.

What I claim is:

1. In a vehicle, the combination comprising a body, a support, means for flexibly connecting said support to said body, said means including resilient cushions interposed therebetween, a pair of axle members, wheels journalled on said axle members, a pair of arms, each arm being rigidly connected with one of said axle members, hinges pivotally connecting said arms to said support for guiding said axle members pivotally about said support, and springs interposed between said body and said arms, said hinges being located at a lower level than and spaced from the axes of said wheels.

2. The combination claimed in claim 1 in which said resilient cushions included in said means for flexibly connecting said support to said body are disposed above said hinges.

3. In a motor vehicle, the combination comprising a body, a support, means for flexibly connecting said support to said body, said means including resilient cushions interposed therebetween, a pair of axle members, wheels journalled on said axle members, a pair of arms, each arm being composed of a sleeve-shaped portion rigidly connected with one of said axle members and with a downwardly projecting portion remote from said one of said axle members, a hinge pivotally connecting said downwardly projecting portion to said support, a shaft connected to said wheel and extending therefrom through said sleeve-shaped portion into at least the vicinity of said support, and springs interposed between said arms and said body, said hinge being located at a lower level than and spaced from said shaft.

4. The combination claimed in claim 1 in which each arm throughout its length extends below and in spaced relationship to the axis of the axle member connected therewith.

5. The combination claimed in claim 1 in which said support is a transmission housing and in which a shaft connected to said wheel extends coaxially therefrom into said housing.

6. The combination claimed in claim 1 in which said hinges are disposed symmetrically with respect to the vertical, longitudinal, central plane of said body.

7. The combination claimed in claim 1 in which said hinges are disposed coaxially, their common axis being located within the vertical, longitudinal, central plane of said body.

8. The combination claimed in claim 3 in which said support is a transmission housing located substantially symmetrically to the longitudinal, central plane of said body.

9. The combination claimed in claim 3 in which said sleeve-shaped portion of one of said arms includes a transmission housing rigidly connected with said downwardly projecting portion, and in which said sleeve-shaped portion of the other one of said arms has an opening at its inner end, said transmission housing being provided with an opening in opposed relationship thereto, said shaft disposed within said last mentioned sleeve-shaped portion extending through said openings into said transmission housing.

10. The combination claimed in claim 1 in which said hinges are located one above the other within the vertical, longitudinal, central plane of said body.

References Cited in the file of this patent
UNITED STATES PATENTS

| | | |
|---|---|---|
| 2,044,196 | Alden | June 16, 1936 |
| 2,417,214 | Roos | Mar. 11, 1947 |